Dec. 28, 1926.
N. B. CREIGHTON
1,612,616
FLUID SHUT-OFF
Filed May 21, 1926
2 Sheets-Sheet 1
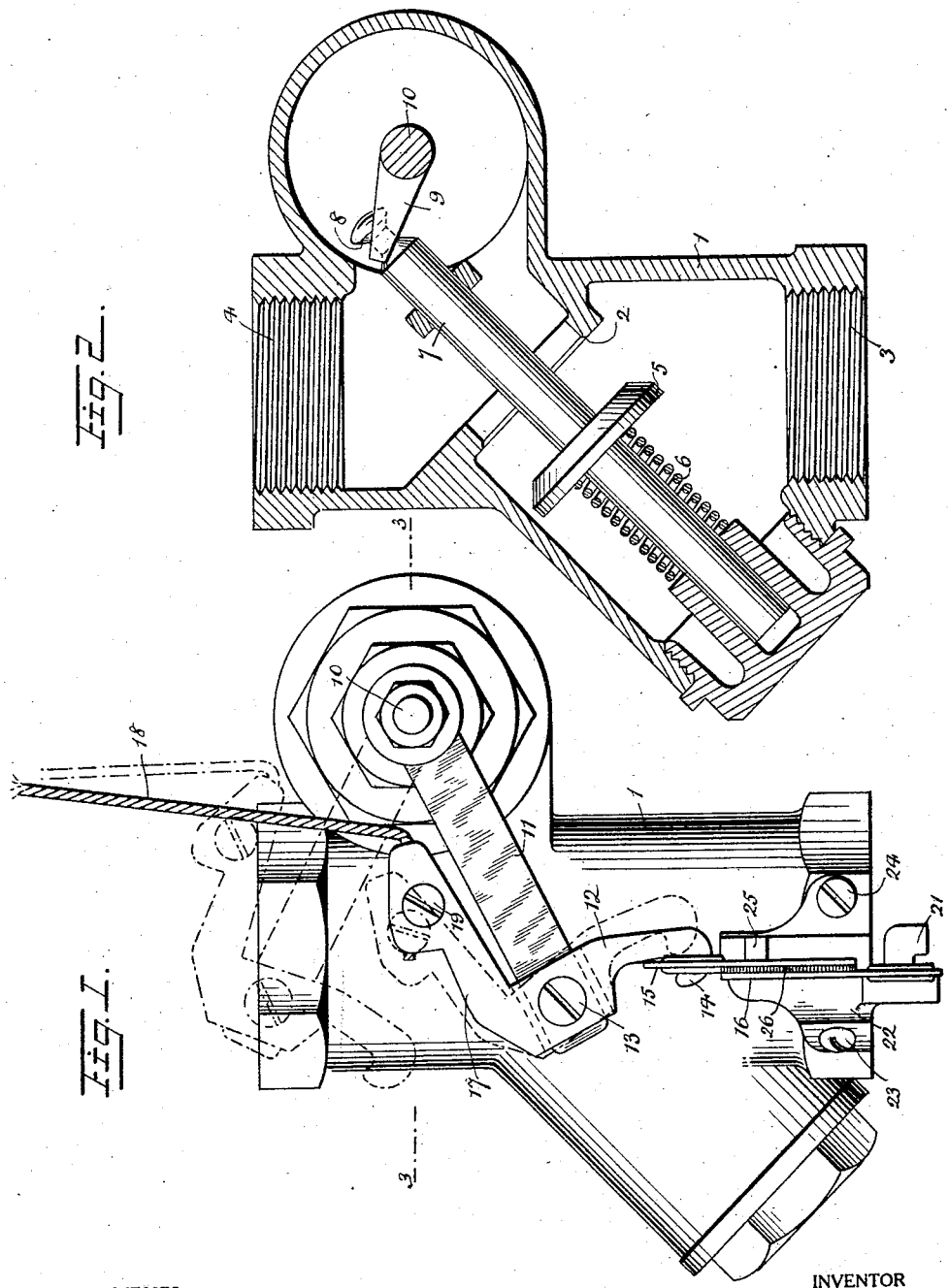
WITNESSES
INVENTOR
N. B. Creighton
BY
ATTORNEYS Dec. 28, 1926.
N. B. CREIGHTON
FLUID SHUT-OFF
Filed May 21, 1926  2 Sheets-Sheet 2
1,612,616
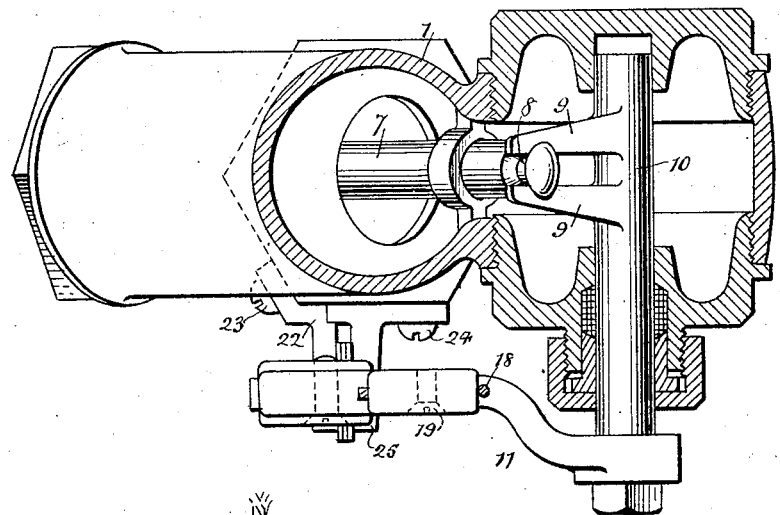
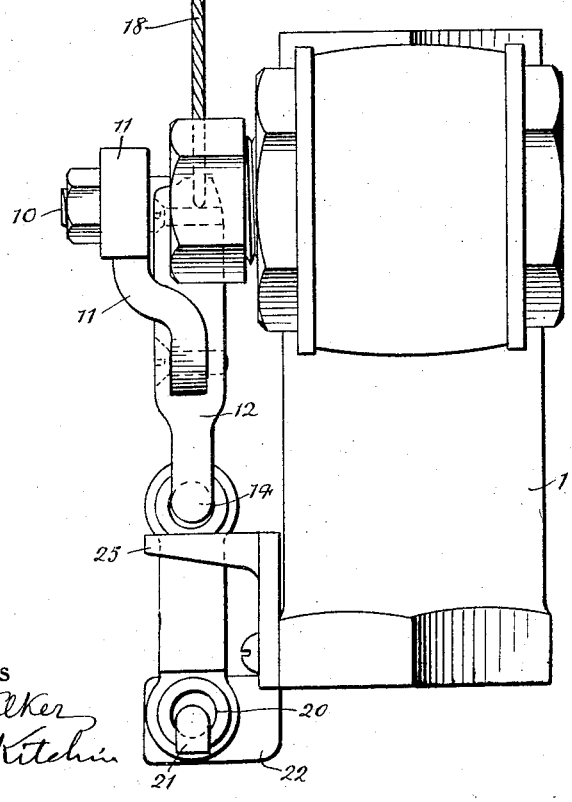
WITNESSES
H. T. Walker
A. L. Kitchin
INVENTOR
N. B. Creighton
BY Munn Co
ATTORNEYS Patented Dec. 28, 1926.

1,612,616

UNITED STATES PATENT OFFICE.

NELSON B. CREIGHTON, OF NEW YORK, N. Y.

FLUID SHUT-OFF.

Application filed May 21, 1926. Serial No. 110,806.

This invention relates to fluid shut-off devices and has for an object to provide an improved construction which may be used to shut off the flow of gas or other fluids either automatically or manually.

Another object of the invention is to provide an improved fluid shut-off device wherein the construction includes a removable link acting as a connector.

A further object of the invention is to provide a fluid shut-off device for use with gas supply pipes and other fluid supply pipes wherein a spring closed valve is associated with means for normally locking the valve open with the parts so constructed and arranged that they may be released manually or by the action of heat.

In the accompanying drawings—

Figure 1 is a side view of a fluid shut-off device disclosing an embodiment of the invention.

Figure 2 is a longitudinal vertical sectional view through the device shown in Figure 1.

Figure 3 is a transverse sectional view through Figure 1 on line 3—3.

Figure 4 is an edge view of the structure shown in Figure 1.

Referring to the accompanying drawings by numerals, 1 indicates the casing of a valve which is provided with a valve seat 2 and with threaded portions 3 and 4 whereby the device may be connected to gas pipes or other pipes carrying a fluid. Co-acting with the seat 2 is a valve disk 5 continually acted on by spring 6 whereby the disk is adapted to be forced against the seat 2 for closing the valve whenever the valve, shaft or rod 7 is released. The end of rod or shaft 7 is provided with a reduced portion 8 for accommodating the arms 9 extending from the rock shaft 10. Shaft 10 is mounted in suitable bearings and at a point exteriorly of the casing 1 is rigidly secured to a lever or arm 11. When the arm 11 is swung to the position shown in Figure 1, the valve is held open as shown in Figure 2. When the parts are moved to the dotted position shown in Figure 1, the disk 5 will be engaging the seat 2 for shutting off the supply of fluid. Pivotally mounted on the arm or lever 11 is a hook 12 held pivotally in place by the pivotal pin 13. Hook 12 is provided with a hook end 14 normally extending through the eye 15 (Figure 4) of the link 16. The hook 12 on the end opposite the hook end is provided with an extension 17 preferably extending at substantially right angles to the main part of hook 12, said extension having an aperture for receiving one end of the cable 18. A clamping screw 19 is mounted in the extension 17 and is positioned to grip or clamp cable 18. It is intended that whenever cable 18 is pulled, the hook 12 will be swung so that the hook end 14 will move out of the eye 15 whereupon the arm 11 will be released and spring 6 will be permitted to function for closing the valve and for swinging arm 11 and hook 12 to the dotted position shown in Figure 1. The link 16 is not only provided with eye 15 but also with an eye 20 which is fitted over the hook member 21 carried by bracket 22. Bracket 22 is secured to the casing 1 in any desired manner, as for instance, by the screws 23 and 24. From Figures 1 and 4, it will also be noted that bracket 22 is provided with a post or abutment 25 against which the link 16 normally rests when the parts are in operative position. The link 16 is shown as provided with two eyes but it will be evident that more could be used without departing from the spirit of the invention and that some other shape could be utilized provided a connecting structure was provided between hook member 21 and hook end 14. The connecting structure or link 16 is preferably made in two parts connected together by a fusible substance 26, said substance being lead, solder or other fusible material. By reason of this structure whenever the link 16 becomes heated to a certain extent, the fusible connecting means 26 will be melted and, consequently, spring 6 will be permitted to swing arm 11 and associated parts whereby the valve is closed and the fluid shut off.

In case it is desired to close the valve without injuring the link 16, a pull on cable 18 will produce the desired result. In pulling the hook end 14 out of eye 15, the same has a tendency to swing the link 16 but the swinging movement is stopped by the post 25 and, consequently, the hook end 14 readily slides out of the eye 15. If the device has been actuated manually, it is only necessary to move the hook 12 and associated parts back to the position shown in Figure 1 in order to put the device in operative position. If the fusible member 26 has been melted, it will then be necessary to provide a new link before the hook 12 is moved back to its former position. It will be evident that the shut off mechanism including link 16, hook 12, arm 11 and associated parts may be used with the valve mechanism shown in the drawing or may be readily used with other forms of valve mechanism without departing from the spirit of the invention provided spring means or other suitable means are presented for swinging arm 11 and the valve mechanism to a closed position when hook 12 is released either manually or through the action of the melting of member 26.

What I claim is:

1. In a fluid shut-off device a valve structure and a spring for closing the same, an arm connected with said valve structure and swung to one position when the valve structure is open and to an opposite position when the valve structure is closed, a hook connected with said arm, a link having an opening for receiving said hook, a bracket connected to said device and provided with a hook member, said link having a second opening through which said hook member projects whereby said hook is held in a given position and said arm is held in such a position as to maintain the valve open and a stationary abutment carried by said bracket positioned adjacent said link and adjacent said hook when the hook is in position for holding the valve open whereby when said hook is withdrawn from the link said abutment will prevent swinging movement of the link.

2. A fluid shut-off device including a valve normally open but adapted to be closed through the action of a spring and provided with a swinging arm for opening the valve against the action of the spring, a hook pivotally mounted on the swinging arm, a bracket secured to the valve structure provided with a hook-shaped member and an abutment, and a fusible link mounted on the bracket, said link having an opening for receiving said hook-shaped member and an opening for receiving the hook mounted on said arm, said abutment being positioned on the bracket so as to engage the link near the hook on the arm and prevent swinging movement of the link when the hook is manually withdrawn.

NELSON B. CREIGHTON.